US010143941B2

(12) United States Patent
Loviat

(10) Patent No.: US 10,143,941 B2
(45) Date of Patent: Dec. 4, 2018

(54) DEVOLATILISATION APPARATUS AND A PROCESS FOR USE THEREOF

(71) Applicant: Sulzer Chemtech AG, Winterthur (CH)

(72) Inventor: François Loviat, Sennhof (CH)

(73) Assignee: Sulzer Chemtech AG, Winterthur (CH)

( * ) Notice: Subject to any disclaimer, the term of this patent is extended or adjusted under 35 U.S.C. 154(b) by 373 days.

(21) Appl. No.: 14/763,707

(22) PCT Filed: Feb. 3, 2014

(86) PCT No.: PCT/EP2014/052070
§ 371 (c)(1),
(2) Date: Jul. 27, 2015

(87) PCT Pub. No.: WO2014/131581
PCT Pub. Date: Sep. 4, 2014

(65) Prior Publication Data
US 2015/0360148 A1   Dec. 17, 2015

(30) Foreign Application Priority Data
Feb. 28, 2013 (EP) .................................. 13157285

(51) Int. Cl.
*B01D 19/00* (2006.01)
*C08F 6/00* (2006.01)
(Continued)

(52) U.S. Cl.
CPC ............. *B01D 19/00* (2013.01); *B01D 3/009* (2013.01); *B01D 19/0005* (2013.01);
(Continued)

(58) Field of Classification Search
CPC .... B01D 19/00; B01D 19/0021; B01D 3/009; B01D 19/0042; B01D 19/0036; C08F 6/003; B29B 2013/005
See application file for complete search history.

(56) References Cited

U.S. PATENT DOCUMENTS 5,118,388 A * 6/1992 Aboul-Nasr ........... B01D 3/008
                                                159/2.1
2005/0161316 A1   7/2005 Hubinger et al.
(Continued)

FOREIGN PATENT DOCUMENTS

DE   2402707 A1 * 9/1974 ......... B01D 19/0042
EP   0369708 A1    5/1990
(Continued)

OTHER PUBLICATIONS

"Electrical Insulating Oil." (n.d.) Environment Canada, Emergencies Science and Technology Division.*
(Continued)

*Primary Examiner* — Youngsul Jeong
(74) *Attorney, Agent, or Firm* — Larson & Anderson, LLC

(57) ABSTRACT

A static devolatilisation apparatus (1) adapted for devolatilising a viscous liquid (2) comprising a volatile component is disclosed. The apparatus (1) comprises a phase separation chamber (100) in an upper region (5) for treating the viscous liquid (2) in a first devolatilisation step to form a first devolatilised viscous liquid (21), and a distributor sub-unit 200 is located below the phase separation chamber (100) and above a lower sump region (4). The sub-unit (200) has a second discharge region (222) embodied such that it is contacted by the first devolatilised viscous liquid (21), and the region (222) has a surface (223) embodied such that the first devolatilised viscous liquid (21) is treated in a second devolatilisation step. The present invention further relates to a process to devolatilising a viscous liquid using the apparatus (1) and also to the use of the apparatus (1) in the devolatilisation of polymer melt or solution.

18 Claims, 6 Drawing Sheets

(51) Int. Cl.
    *B01D 3/00*         (2006.01)
    *B29B 13/00*      (2006.01)
    *B01J 4/00*         (2006.01)

(52) U.S. Cl.
    CPC ..... *B01D 19/0021* (2013.01); *B01D 19/0036* (2013.01); *B01D 19/0042* (2013.01); *B29B 13/00* (2013.01); *C08F 6/003* (2013.01); *B01J 4/001* (2013.01); *B29B 2013/005* (2013.01)

(56) References Cited

U.S. PATENT DOCUMENTS

| | | |
|---|---|---|
| 2007/0120285 A1 | 5/2007 | Corleto et al. |
| 2007/0137488 A1* | 6/2007 | Streiff ................ B01D 19/0047 96/218 |
| 2007/0164462 A1 | 7/2007 | Liu et al. |
| 2010/0296360 A1* | 11/2010 | Inagawa ................ B29B 7/845 366/83 |

FOREIGN PATENT DOCUMENTS

| | | |
|---|---|---|
| EP | 1625924 A2 | 2/2006 |
| JP | 30-00250 U | 1/1955 |
| JP | 2002527219 A | 8/2002 |

OTHER PUBLICATIONS

DE 2402707 A1 English translation by Espacenet.*
Hacisevki, Chapter 8 Internal Flow Lecture Slides, Fluid Mechanics: Fundamentals and Applications, 2nd Edition, 2010.*

* cited by examiner

DEVOLATILISATION APPARATUS AND A PROCESS FOR USE THEREOF

BACKGROUND OF THE INVENTION

The present invention relates to a static devolatilisation apparatus for devolatilising a viscous liquid comprising a volatile component. The present invention also relates to a process for using said apparatus to devolatilise a viscous liquid comprising a volatile component and the use of said apparatus in the devolatilisation of a viscous liquid.

The devolatilisation of viscous liquids to remove volatile components is of commercial interest. For example, harmful or unwanted volatile components may be removed to improve the purity or other properties of the viscous liquid, or it may be of interest to separate and allow the recovery and potential recycle of volatile components.

In one specific application, polymer devolatilisation is a separation process in which "volatiles" are to be removed from a final polymer, which is in the melt, liquid or solution phase. The "volatiles" to be removed may include solvents, water, residual unreacted monomer(s) (e.g. styrene in the case of polystyrene), by-products, impurities and/or other volatile low molecular weight species such as dimers, trimers, and other oligomeric compounds. Therefore in order to reach a marketable quality, polymers must be degassed at the end of the polymerization step in order to remove such volatiles from the raw resin. This operation is usually achieved by heating the polymer at relatively high temperature (100-350° C.) depending on the polymer, under a pressure which can go from vacuum up to few bars.

The final amount of "volatiles" in the polymer after the devolatilisation is generally required to be quite low, for example, typically between about 100 and about 1000 ppm. Low contents of volatiles are desired to improve the processing and other properties of the polymer. For some specific polymers, removal of toxic monomers and/or solvents may be of importance for Environmental, Health and Safety (EHS) reasons. For example, low levels of volatiles can negatively impact the extrusion, injection molding, or blow molding processing of polymers or lead to formed polymer articles of poor quality.

The separation between polymer and volatile component species in the degassing or devolatilisation process is based on the difference of volatility between those species. The driving force for the devolatilisation is the lower chemical potential in the gas phase than in the polymer. This difference of chemical potential causes the formation of a concentration gradient at the polymer interface resulting in a diffusion flux from the polymer to the gas phase.

The chemical potential of a species in a medium is a function of its concentration in the particular phase and on the temperature. The driving force of the mass transfer can be enhanced by simultaneously increasing the temperature of the polymer and reducing the partial pressure of the species to devolatilise it to the gaseous phase. Those actions are however limited by various factors like the polymer stability and the vacuum system capacity.

The chemical potential allows a determination of the theoretical equilibrium distribution of a solute in a multi-phase system, but it does not give any kinetic information on the mass transfer process. In fact, the transfer of a solute between two phases is never instantaneous. The time required to reach the equilibrium state can be significant especially in the case of very viscous liquids such as polymer melts or solutions and/or a small difference of chemical potential between the phases, for example due to a low volatility or a low concentration in the viscous liquid or polymer of the species to devolatilise.

It is often desirable to increase the mass transfer kinetics in order to limit the size of the devolatilisation equipment or the residence time of the polymer under the harsh devolatilisation conditions, which often cause polymer degradation.

Devolatilisation (degassing) typically occurs in two steps. Initially, at high solute concentration, solute bubbles are nucleated, grow in the polymer melt and reach the melt/gas interface where they rupture and solute is released into the gas phase. This initial step known as foam degassing is relatively fast. However, below a certain concentration threshold of solute in the polymer melt, foaming does not take place any more. A stripping agent, which is typically a volatile compound not reacting with the polymer and easy to separate can be admixed to the polymer before the devolatilisation step in order to force foaming and therefore enhance the degassing efficiency. This technique is however not always applicable due to various reasons such as a chemical incompatibility of the stripping agent with the polymer (e.g. causing degradation of the polymer) or an insufficient capacity of the devolatilisation overhead system.

Various types of devolatilizer apparatuses are known. The way the mass transfer between the polymer and gas phases can be enhanced depends on the type of degassing equipment used. Available equipments can be classified into two main families which are the dynamic and the static technologies, each one having its intrinsic drawbacks and advantages. This classification refers to the way the mass transfer is being enhanced.

In "dynamic" equipment the mass transfer is enhanced by the means of moving parts like screws, blades or arms in order to ensure a high rate of surface renewal (higher interfacial concentration gradient) and specific surface creation (more surface through which diffusion can take place). In one case, such apparatuses may have rotating parts, such as in the case of extruders or kneaders, for providing surface renewal, evaporative cooling and efficient mixing to allow an optimal heat and mass transfer. Such a devolatilising extruder is disclosed, for example, in US 2010/0296360 A1. The commercially available dynamic devolatilising or degassing equipment allows a devolatilisation of highly viscous liquids such as polymers, but they have significant drawbacks. Among those, one can note their very high price, complex mechanical construction with tight tolerances, high energy consumption, higher leak rates (thus requiring over-dimensioned vacuum systems), and need for regular maintenance.

In contrast, static devolatilising equipment cannot provide any significant surface renewal, and instead they function mainly based on the creation of a high specific surface by means of dedicated equipment internals. The geometry of those internals is pivotal as they will define the quality of the devolatilising operation in terms of polymer degradation and separation effect. Advantageously such static devolatilizers generally have only pumps, such as discharge pumps for the devolatilised polymer or pumps for heat transfer media, as their moving parts.

A typical internal of a static devolatiliser is a phase separation chamber, often called a "distributor", having the shape of a tube with a beveled edge. On this edge is mounted a perforated plate through which the polymer melt or solution is freely flowing. The number and size of the perforated plate openings is designed so that the pressure drop through this plate allows the maintenance of a certain level of filling in the distributor. It should not be empty, in which case the polymer residence time would be too low. It should not be full, in which case the pressure in the distributor would increase, preventing an efficient devolatilising of the polymer.

A state of the art static devolatilisation apparatus is disclosed in US 2007/0137488 A1. The drawback of such known static devolatisation apparatuses is that most of the residence time of the polymer takes place in the distributor where the polymer is present as a "bulk" with a very low specific surface exposed to vacuum or reduced pressure. In practice, the polymer is very often foaming in the distributor, filling it completely and therefore limiting the efficiency of the degassing process. After passing through the perforated plate and thereby being dispersed, the polymer flows then straight into the discharge pump and is directly evacuated. The residence time of the dispersed polymer in the devolatilisation vessel is therefore often very limited, typically in the range of seconds for lower viscosity liquids. As a result, the devolatilisation is often insufficient to provide a high quality product having a low concentration of volatiles.

One may try to obtain a higher quality product having a lower concentration of volatiles by increasing the residence time in the static devolatiliser; however, increasing the residence time at elevated temperatures in order to achieve a low content of volatiles typically results in a degradation of thermally-sensitive viscous liquids such as polymer melts and solutions. This is because in conventional static devolatilisers most of the residence time of the polymer takes place in the distributor where only a very low specific surface of the viscous liquid is exposed to vacuum or reduced pressure, and therefore much of the overall residence time in the static devolatiliser is not very effective.

In conclusion, it would be desirable to have a static devolatilision apparatus which allows for a more efficient specific surface creation and a longer residence time of the dispersed viscous liquid (e.g. polymer melt or solution) in the devolatilisation equipment. Such an apparatus would allow for a more efficient devolatilisation for a given residence time or a lower residence time, meaning less viscous liquid (e.g. polymer) degradation, for a given desired volatile component (e.g. residual monomer) concentration in the product.

SUMMARY OF THE INVENTION

Starting from this state of the art, it is an object of the invention to provide a static devolatilisation apparatus for devolatilising a viscous liquid comprising a volatile component that does not suffer from the previous mentioned deficiencies, particularly a less efficient specific surface creation and only a relatively short residence time of exposure to vacuum or reduced pressure of the dispersed liquid having a high specific surface. Further objects of the invention include providing a process for using said apparatus in devolatilising a viscous liquid comprising a volatile component and a use of said apparatus in the devolatilisation of a viscous liquid, preferably a polymer melt or solution, comprising a volatile component.

According to the invention, these objects are achieved by a static devolatilisation apparatus for devolatilising a viscous liquid comprising a volatile component, wherein the apparatus comprises:
  a container for receiving a first devolatilised viscous liquid, said container having a lower sump region for collecting a second devolatilised viscous liquid, an upper region for discharging a gas, and a central region between said lower sump region and said upper region;
  a discharge pump in fluid communication with said lower sump region for discharging the second devolatilised viscous liquid therefrom;
  an extraction line for discharging gas from the container, wherein said line is preferably located in said upper region; and
  a phase separation chamber in said upper region of said container, wherein the phase separation chamber comprises an inlet for the viscous liquid to be treated in a first devolatilisation step to form a first devolatilised viscous liquid, a plurality of first discharge openings in a lower portion of a first discharge region for discharging said first devolatilised viscous liquid downwardly towards said lower sump region and at least one gas discharge opening in an upper portion of said first discharge region for discharging gas upwardly to said extraction line;
wherein a distributor sub-unit is located in said central region and below the phase separation chamber and above the lower sump region, wherein the distributor sub-unit has a second discharge region, wherein the second discharge region is embodied such that it is contacted by the first devolatilised viscous liquid discharged from the first discharge openings of the phase separation chamber, and wherein the second discharge region has a surface embodied such that the first devolatilised viscous liquid is treated in a second devolatilisation step on said surface to form a second devolatilised viscous liquid, and wherein the region additionally has a plurality of second discharge openings in fluid communication with the discharge pump and for the discharge of said second devolatilised viscous liquid.

According to the invention, these further objects are achieved firstly by a process for devolatilising a viscous liquid comprising a volatile component using the apparatus of the invention, wherein the process comprises:
  a first devolatilisation step in which the viscous liquid is treated in a phase separation chamber to form a first devolatilised viscous liquid, and
  a second devolatilisation step in which the first devolatilised viscous liquid is treated in a distributor sub-unit having a second discharge region to form a second devolatilised viscous liquid, whereby the second discharge region has a surface embodied such that the second devolatilisation step takes place on said surface and the residence time of the first devolatilised viscous liquid in the container and/or the specific surface of the first devolatilised viscous liquid in the container is thereby increased.

Said apparatus and said process is used in accordance with the invention in the devolatilisation of a viscous liquid, preferably a polymer melt or solution, comprising a volatile component. As will be discussed, such liquids and processes particularly benefit from the present invention.

The present invention achieves these objects and provides a solution to this problem by means of a distributor sub-unit located in said central region and below the phase separation chamber and above the lower sump region, wherein the sub-unit has a second discharge region, wherein the second discharge region is embodied such that it is contacted by the first devolatilised viscous liquid discharged from the first discharge openings of the phase separation chamber, and wherein the second discharge region has a surface embodied such that the first devolatilised viscous liquid is treated in a second devolatilisation step on said surface to form a second devolatilised viscous liquid, and wherein the region additionally has a plurality of second discharge openings in fluid communication with the discharge pump and for the discharge of said second devolatilised viscous liquid. As a result of the surface embodied such that the first devolatilised viscous liquid is treated in a second devolatilisation step on said surface to form a second devolatilised viscous liquid, the residence time of the first devolatilised viscous liquid in the container and/or the specific surface of the first devolatilised viscous liquid dispersed over the surface of the second discharge region of the distributor sub-unit is increased. Furthermore due to this surface and the second devolatilisation step taking place on it there is thus a more efficient overall specific surface creation and significantly increased residence time of exposure to vacuum or reduced pressure of the dispersed liquid having a high specific surface in the apparatus and the process of using it. As a result, the apparatus and process of the invention allow for a more efficient devolatilisation for a given residence time or a lower residence time, meaning less viscous liquid (e.g. polymer) degradation, for a given desired volatile component (e.g. residual monomer) concentration in the product.

These results are then surprisingly achieved without the need for any special elaborate apparatuses involving moving parts such as screws, blades or arms and without detrimentally causing extensive thermal degradation of the viscous liquid or requiring a significant increase of the residence time in the apparatus. In fact, the utilisation of the distributor sub-unit with its second discharge region having a surface provides a significantly increased residence time of the dispersed viscous liquid in the apparatus, and thereby the residence time of the viscous liquid (bulk) in the phase separation chamber may be favourably reduced, for example, by more than 80%, while achieving the same or better product quality in terms of reduced volatiles content.

In a preferred embodiment of the apparatus or process, the distributor sub-unit has a third discharge region embodied such that it is not contacted by the first devolatilised viscous liquid discharged by the first discharge openings of the phase separation chamber, and wherein the region has optional third discharge openings for discharge of a gas. The third discharge region may beneficially be used as part of a means for fixing the distributor sub-unit within the container. For example, it may have fixation points for connection to the inner wall of the container or for hanging from the overhead phase separation chamber. Alternatively the third discharge region may provide a surface to support the distributor sub-unit when it is simply laying on top of the container's funnel-shaped lower sump region. In a preferred embodiment, the third discharge openings are present and they facilitate the discharge of gas from the lower sump region in the case that the extraction line is located above the distributor sub-unit. The redistribution of the viscous liquid by the distributor sub-unit accelerates devolatilisation, and the released gas can easily escape by the openings in the third discharge region. In another embodiment, no third discharge openings are present because the extraction line is located below the distributor sub-unit, and thus no upwards gas discharge is required.

According to another preferred embodiment of the apparatus and the process, there is a gap present between the distributor sub-unit and an inner wall of the container. As just discussed with reference to the third discharge openings, such a gap will beneficially allow for an easy escape of released gas, particularly in those embodiments in which the extraction line is located above the distributor sub-unit.

According to yet another preferred embodiment of the apparatus and the process, the lower portion of the first discharge region has a first cross-sectional area that is less than a second cross-sectional area of the second discharge region. Such a relationship in the relative areas of the regions has the advantage of ensuring that no viscous liquid passes by the distributor sub-unit without being redistributed.

In a further preferred embodiment, the second discharge openings are embodied such that the openings have cross-sectional areas that increase as the openings are progressively located towards an outer perimeter of the second discharge region. The openings in the central region of the second discharge region and its surface are advantageously relatively smaller in diameter to ensure that strands of first devolatilised viscous liquid discharged from the first discharge openings above do not readily pass thru the second discharge region without being redistributed on its surface.

According to a further other preferred embodiment of the apparatus and the process, the apparatus additionally comprises one to four further distributor sub-units. The provision of additional distributor sub-units may beneficially increase the efficiency of the devolatilisation by providing additional surfaces and thus additional residence time and devolatilisation steps on these surfaces, for example, for processes or products requiring the achievement of particularly low levels of residual volatile component(s).

According to yet a further other preferred embodiment of the apparatus and the process, the surface(s) of the second discharge region(s) of the distributor sub-unit(s) are embodied such that the surfaces(s) increase the residence time of the first devolatilised viscous liquid in the container and/or the specific surface of the first devolatilised viscous liquid dispersed over the surface of the second discharge region of the distributor sub-unit. Increasing the residence time and/or specific surface beneficially increases the efficiency of the devolatilisation and allows lower concentrations of residual volatile component(s) to be attained.

According to still yet a further other preferred embodiment of the apparatus and process, the distributor sub-unit(s) have shape(s) that are selected from plates, trays, or cones. The inventors have found that such shapes may be readily formed and at low cost for use in the invention. Additionally, the have proven to be relatively easy to mount and install in the apparatus.

According to still yet a further preferred embodiment of the apparatus and the process, moving parts are absent within the container, which then beneficially reduces maintenance, operational complexity, energy consumption, as well as their associated costs.

In yet another preferred embodiment of the apparatus, the apparatus has an inlet for the dosing of a stripping agent, wherein the inlet is preferably located in the lower sump region. Similarly, in a preferred embodiment of the process a stripping agent is dosed to the viscous liquid before the phase separation chamber and/or dosed in the container, preferably by means of an inlet located in the lower sump region. As discussed earlier, the use of a stripping agent may have different effects, for example, increasing the foaming and reducing the partial pressure of the residual monomer or other volatile component if the inlet is located before the phase separation chamber. If the inlet for the stripping agent is instead located in the lower sump region, then there will be no foaming increase but instead an enhanced devolatilisation efficiency.

In the present invention, a viscous liquid is defined as one having a viscosity at the operating temperature of the phase separation chamber of at least 1, preferably 10, more preferably 100, most preferably 1000 pascal-second. The viscosity may be determined by conventional methods well known in the art including capillary or falling ball viscometers, rotational cone/plate rheometers, or capillary rheometers (listed in order of preference for increasing viscosity and shear ranges).

In a preferred embodiment of the process and in a preferred use of the apparatus, the viscous liquid is a polymer melt or polymer solution and the volatile component is a solvent or a monomer. In the present invention, "polymer melt" refers to a polymer maintained at a high enough temperature to be in a liquid state and able to undergo flow without the inclusion of significant amounts of solvents (e.g. while containing less than 50 mass % of solvent based on the total mass of polymer and solvent). "Polymer solution" refers to mixtures of polymer and solvent in which the solvent content is 50 mass % or more based on the total mass of polymer and solvent. The invention has proven to be particularly useful in the devolatilisation of such viscous liquids.

One skilled in the art will understand that the combination of the subject matters of the various claims and embodiments of the invention is possible without limitation in the invention to the extent that such combinations are technically feasible. In this combination, the subject matter of any one claim may be combined with the subject matter of one or more of the other claims. In this combination of subject matters, the subject matter of any one process claim may be combined with the subject matter of one or more other process claims or the subject matter of one or more apparatus claims or the subject matter of a mixture of one or more process claims and apparatus claims. By analogy, the subject matter of any one apparatus claim may be combined with the subject matter of one or more other apparatus claims or the subject matter of one or more process claims or the subject matter of a mixture of one or more process claims and apparatus claims. By way of example, the subject matter of any one claim may be combined with the subject matters of any number of the other claims without limitation to the extent that such combinations are technically feasible.

One skilled in the art will understand that the combination of the subject matters of the various embodiments of the invention is possible without limitation in the invention. For example, the subject matter of one of the above-mentioned preferred apparatus embodiments may be combined with the subject matter of one or more of the other above-mentioned preferred process embodiments or vice versa without limitation.

BRIEF DESCRIPTION OF THE DRAWINGS

The invention will be explained in more detail hereinafter with reference to various embodiments of the invention as well as to the drawings. The schematic drawings show.

DETAILED DESCRIPTION OF THE INVENTION

Figure 1:
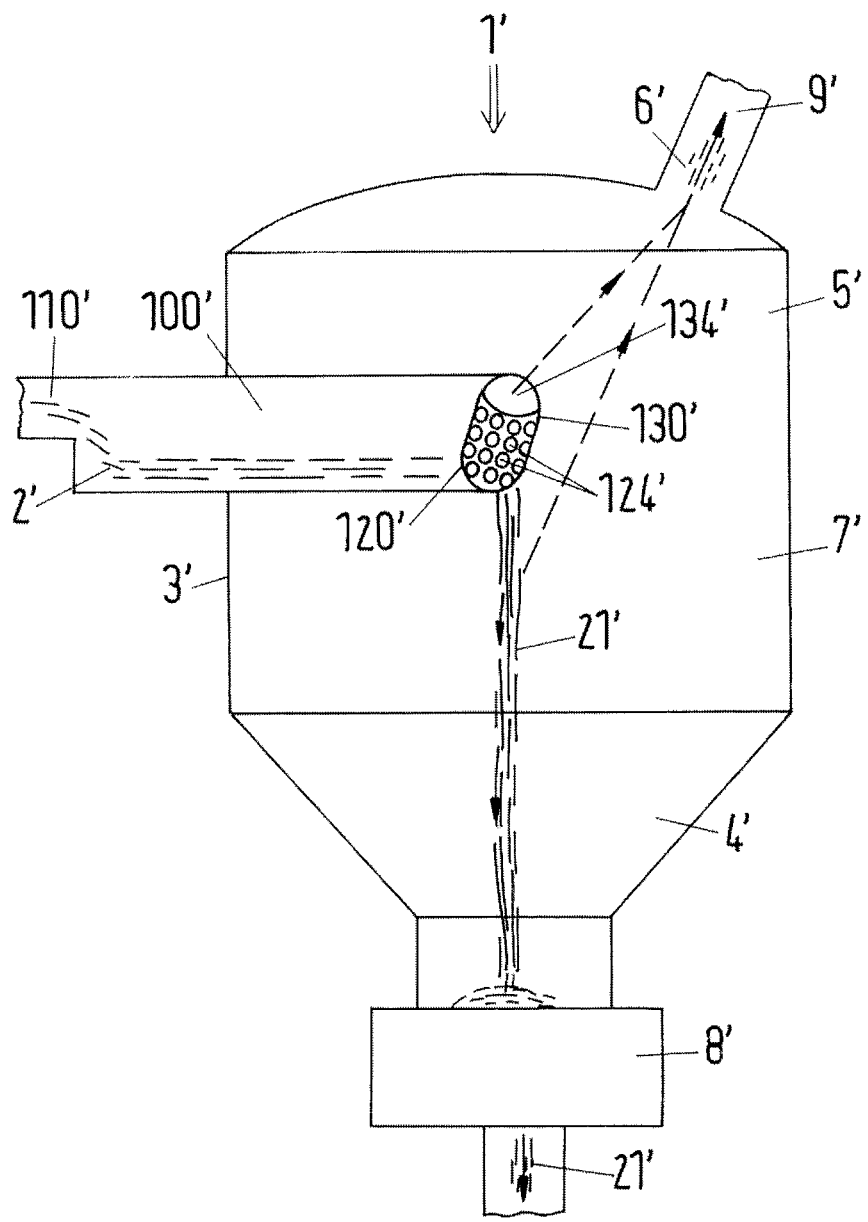
FIG. 1 shows a schematic view of a static devolatilisation apparatus according to the prior art.

FIG. 1 shows a schematic view of a static devolatilisation apparatus for devolatilising a viscous liquid 2' comprising a volatile component according to the prior art, which as a whole is labeled with reference number 1'. This apparatus 1' consists of:
 a container 3' for receiving a first devolatilised viscous liquid 21', said container 3' having a lower sump region 4' for collecting a second devolatilised viscous liquid 22', an upper region 5' for discharging a gas 6', and a central region 7' between said lower sump region 4' and said upper region 5';
 a discharge pump 8' in fluid communication with said lower sump region 4' for discharging the first devolatilised viscous liquid 21' therefrom;
 an extraction line 9' for discharging gas 6' from the container 3', wherein said line 9' is preferably located in said upper region 5'; and
 a phase separation chamber 100' in said upper region 5' of said container 3', wherein the phase separation chamber 100' comprises an inlet 110' for the viscous liquid 2' to be treated in a first devolatilisation step to form a first devolatilised viscous liquid 21', a plurality of first discharge openings 124' in a lower portion 120' of a first discharge region 122' for discharging said first devolatilised viscous liquid 21' downwardly towards said lower sump region 4' and at least one gas discharge opening 134' in an upper portion 130' of the first discharge region 122' for discharging gas 6' upwardly to said extraction line 9'.

As discussed earlier, such prior art static devolatilisation apparatuses 1' often provide insufficient devolatilisation, especially for highly viscous liquids 2' containing large quantities of volatiles and/or for which the final product specification allows for only very low concentrations of residual volatiles. In such prior art apparatuses 1', the first devolatilised viscous liquid 21' after having passed through the lower portion 120' of the first discharge region 122' (typically a perforated plate) and thereby being dispersed, it flows then straight into the discharge pump 8' and is directly evacuated. The residence time of the dispersed first devolatilised viscous liquid 21' in the container 3' is therefore very limited and thus insufficient to provide a high quality product having a low concentration of undevolatilised or residual volatiles.

Figure 2:
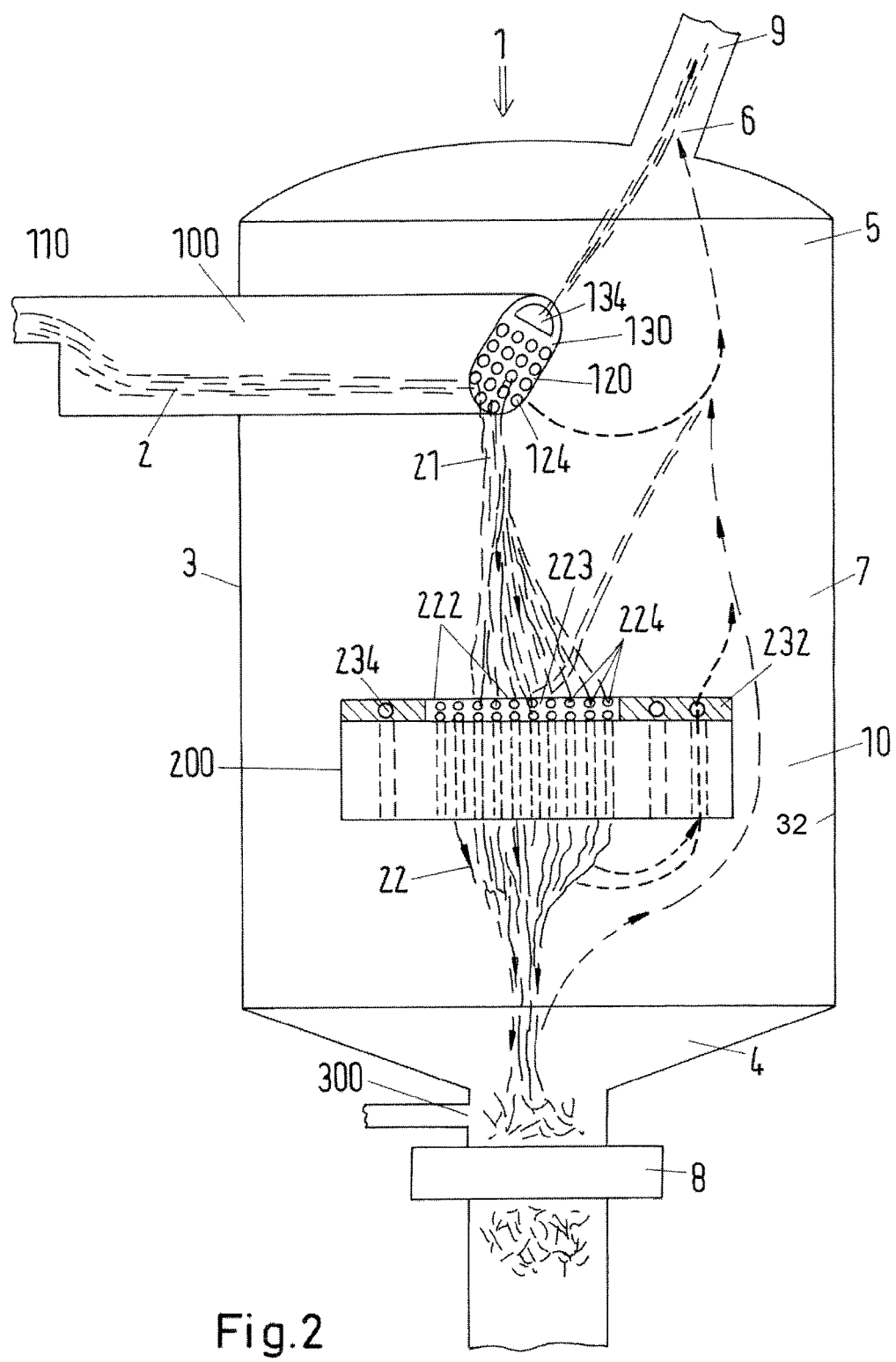
FIG. 2 shows a schematic view of an embodiment of a static devolatilisation apparatus according to the invention having a distributor sub-unit having a second discharge region, and wherein the second discharge region has a surface embodied such that the first devolatilised viscous liquid is treated in a second devolatilisation step on said surface.

FIG. 2 shows a schematic view of an embodiment of a static devolatilisation apparatus according to the invention, which as a whole is labeled with reference number 1. The apparatus 1 is not specifically limited as to form, shape, construction or composition unless specifically indicated otherwise. Any suitable material that can be fabricated can be made into an apparatus 1. For reasons of economy, apparatuses 1 are often made from stainless steel or another material indicated for the specific application. Static devolatilisation apparatus internal components are generally made from metals depending upon the process requirements. In one embodiment the apparatus 1 and its components are constructed of metals. Suitable metals include carbon steel, stainless steel, nickel alloys, copper alloys, titanium and zirconium.

The embodiment in FIG. 2 shows a substantially vertical apparatus 1, but it will be understood by one skilled in the art that other orientations of the apparatus 1 are possible, so long as technically feasible.

The embodiment of the static devolatilisation apparatus 1 of the invention shown schematically in FIG. 2 differs from the prior art apparatus 1' shown in FIG. 1 in that it additionally comprises a distributor sub-unit 200 located in said central region 7 and below the phase separation chamber 100 and above the lower sump region 4, wherein the distributor sub-unit 200 has a second discharge region 222, wherein the second discharge region 222 is embodied such that it is contacted by the first devolatilised viscous liquid 21 discharged from the first discharge openings 124 of the phase separation chamber 100, and wherein the second discharge region 222 has a surface 223 embodied such that the first devolatilised viscous liquid 21 is treated in a second devolatilisation step on said surface 223 to form a second devolatilised viscous liquid 22, and wherein the region 222 additionally has a plurality of second discharge openings 224 in fluid communication with the discharge pump 8 and for the discharge of said second devolatilised viscous liquid 22.

The provision of the distributor sub-unit 200 with its second discharge region 222 having the surface 223 provides for the creation of a very high specific surface area and a longer residence time of the viscous liquid 2 (e.g. polymer melt or polymer solution) in a dispersed form exposed to reduced pressure and optional stripping streams within the container 3. The resulting apparatus 1 thereby allows a more efficient devolatilisation and is especially suited to demanding devolatilisation tasks resulting from elevated viscosity, low volatile component (e.g. monomer) vapor pressure or highly heat sensitive viscous liquids 2 (e.g. heat sensitive polymer melts and solutions).

It is noted for clarity that an additional difference in the apparatus 1 of the invention is that the discharge pump 8 is for discharging the second devolatilised viscous liquid 22 in the lower sump region (4) and not for discharging the first devolatilised viscous liquid 21' as in the prior art apparatus 1', as shown in FIG. 1 for prior art apparatus 1' and in FIG. 2 for the apparatus 1 of the invention.

Static devolatilisation apparatuses and their construction and operation are well known in the art, for example, as disclosed in Devolatilization of Polymers Fundamentals—Equipment—Applications, edited by J. A. Biesenberger, published by Hansen in 1988 (ISBN 978-0-19-520721-7) or Polymer Devolatilization by R. J. Albalak, published in 1996 by Marcel Dekker (ISBN-13 978-0824796273). Unless specifically indicated otherwise, conventional construction materials and means, as well as components and auxiliaries, may be used for the apparatus 1, and the apparatus 1 may be operated in a devolatilisation process in a conventional manner using conventional process parameters such as operating temperatures, operating pressures, and residence times as known in the art. For example, these cited reference textbooks disclose a variety of conventional preheaters, distributors, manifolds, internals, pumps, valves and stripping agents for use in devolatilisation apparatuses.

The viscous liquid 2 is not specifically limited and may comprise one or more polymers, organic or inorganic compounds, solvents, water or mixtures thereof. Likewise the volatile component(s) of the viscous liquid 2 are not specifically limited and may comprise one or more organic or inorganic compounds, solvents, water, monomers, byproducts or mixtures thereof. In a preferred embodiment, the viscous liquid 2 is a polymer melt or polymer solution and the volatile component comprises a monomer and/or solvent, as such systems have been found to particularly benefit from the present invention. For example, residual monomer and volatiles must be removed from the polymer product in the bulk or solution polymerization of polystyrene, styrene/acrylonitrile copolymers (SAN) or rubber modified styrene/acrylonitrile copolymers (ABS, AES, etc.). In other certain specific embodiments, the polymer may be a polyolefin, polyester, polycarbonate, polyacrylate, or polyamide, and the polymer may be prepared by bulk, solution, emulsion or melt polymerization methods.

In specific embodiments, the viscous liquid 2 to be treated may be expanded before entry into the phase separation chamber 100 by expansion devices, namely by a valve, a diaphragm or a static mixer, from a relatively high pressure of, for example, 3 bar to the pressure in the interior space of the phase separation chamber 100 (for example, 1 bar).

The phase separation chamber 100 in the apparatus 1 of the invention is not specifically limited and is conventional as known in the art. During operation, the viscous liquid 2 comprising a volatile component to be treated is delivered into the phase separation chamber 100 by means of inlet 110 and in a first devolatilisation step foamed by expansion to produce a mixture of liberated gas 6 (volatile component(s)) and first devolatilised viscous liquid 21 (reduced-gas viscous liquid). The resulting fractions are then discharged through the respective openings in a first discharge region 122 of the phase separation chamber 100. In particular, the viscous liquid 2 within the phase separation chamber 100 is foamed to produce a gas 6 and a first devolatilised viscous liquid 21. The gas 6 is discharged from the phase separation chamber 100 upwardly into the upper region 5 of the container 3 through at least one gas discharge opening 134 in the upper portion 130 of the first discharge region 122. The first devolatilised viscous liquid 21 is discharged by means of a plurality of first discharge openings 124 located in the lower portion 120 of the first discharge region 122, and the first devolatilised viscous liquid 21 having a reduced content of volatile component(s) is discharged from the phase separation chamber 100 downwardly towards the lower sump region 4 of the container 3.

It may be advantageous to distribute the first discharge openings 124 in the lower portion 120 (first devolatilised viscous liquid 21 discharge portion) of the first discharge region 122 in an irregular manner so that a variable opening density is present, for example a graduation of this density such that the density increases upwardly. A longer dwell time of the viscous liquid 2 to be treated in the phase separation chamber 100 can thereby be achieved. A variable opening density can also be provided in the in the upper portion 130 (gas 6 discharge portion). The openings 124 of the lower portion 120 and the opening(s) 134 of the upper portion 130 may be of different or same sizes and of different or same shapes. The opening density, the opening diameter and also the thickness of the first discharge region 122 (e.g. a perforated plate) can be matched to a provided throughput or throughput range of the static devolatilisation apparatus 1 and/or to the viscosity range of the viscous liquid 2.

Pressure differences will typically be present between the interior space of the phase separation chamber 100 and the upper region 5 of the container 3. If the devolatilisation is operated at a low pressure (e.g. produced by a vacuum pump), the maximum pressure difference at the lower portion 120 of a first discharge region 122 will typically be about 100 mbar at most. At a high devolatilisation pressure, the maximum pressure difference can also be higher, for example 500 mbar. The pressure differences drive the two fractions from the separation chamber 100 through the openings in the lower portion 120 and the upper portion of the first discharge region 122, on the one hand, and allow the bubbles to expand further, on the other hand, so that they burst.

In specific embodiments of the apparatus 1 and process of the invention, the inlet 110 of the phase separation chamber 100 is in fluid communication with a polymerization unit (not shown) and the extraction line 9 is in fluid communication with a condensation and/or vacuum overhead unit (both not shown). The apparatus 1 and process of the invention may beneficially be used in conjunction with such units and their processes, especially as part of a polymerization plant.

In certain specific embodiments, a valve is in fluid communication with the inlet 110 of the phase separation chamber 100 in order to advantageously avoid degassing of the viscous liquid 2 (e.g. a polymer melt) taking place before the static devolatilization apparatus 1.

Figure 3:
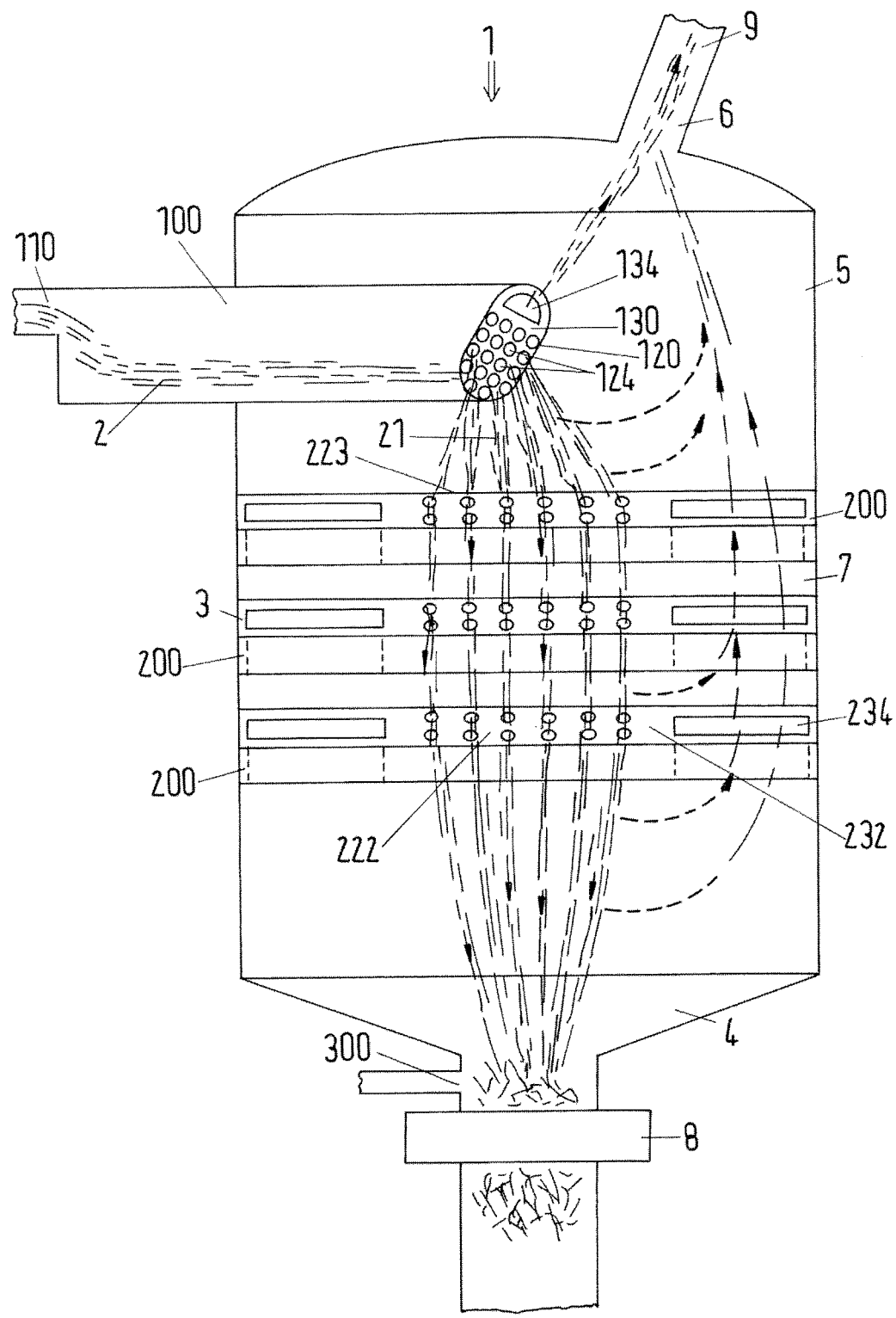
FIG. 3 shows a schematic view of a preferred embodiment of a static devolatilisation apparatus according to the invention, in which the apparatus has two further distributor sub-units.

As shown in FIGS. 2 and 3, the phase separation chamber 100 preferably includes a part arranged in the container 3 and a part arranged outside the container 3. The inlet 110 for the viscous liquid 2 to be treated in a first devolatilisation step advantageously leads through a heat exchanger (not shown) which advantageously has a thermally insulating jacket. Installations in the form of static mixer elements or heat-conducting ribs may be advantageously arranged in the inlet 110. Such installations may be used to contribute to a heat transfer from a heat transfer medium into the viscous liquid 2 to be treated. Optionally a heat exchanger may alternatively or additionally be located inside the container 3. Such heat exchangers are not specifically limited and they may be of the tubular, plate, extended surface, regenerative, shell and tube types, and the flow arrangement may be single pass, such as counter, parallel, cross, split or divided flow types.

Thus during operation of the apparatus 1, the viscous liquid 2 containing volatile component(s) is treated such that volatile components are separated from the viscous liquid 2 by means of an expansion evaporation in the first devolatilisation step in the phase separation chamber 100. The gases 6 formed from the volatile components can additionally be liberated in part from falling films and/or strands in the container 3 which can be evacuated as a rule.

In addition, the apparatus 1 and process of the invention provide that volatile component(s) can be further liberated in a second devolatilisation step from the first devolatilised viscous liquid 21 that becomes dispersed over the surface 223 of the second discharge region 222 of the distributor sub-unit 200. This second devolatilisation step thereby increases the residence time in the container 3 and/or the specific surface of the first devolatilised viscous liquid 21 dispersed over the surface 223 of the second discharge region 222. Thus by means of the first and second devolatilisation steps the content of volatile component(s) will be progressively reduced in proceeding from the viscous liquid 2 to the first devolatilised viscous liquid 21 to the second devolatilised viscous liquid 22.

As shown in the embodiment in FIG. 3 further reductions in the content of residual volatile component(s) may be achieved by installing further distributor sub-units 200 arranged vertically within the container. Such further distributor sub-units 200 provide additional devolatilisation steps in which the residence time and/or the specific surface of the first devolatilised viscous liquid 21 dispersed over the surface 223 of the second discharge region 222 is beneficially increased.

The shape of the distributor sub-unit(s) 200 is not specifically limited provided that the surface(s) 223 of the second discharge region(s) 222 of the distributor sub-unit(s) 200 are embodied such that the surfaces(s) 223 increase the residence time of the first devolatilised viscous liquid 21 in the container 3 and/or the specific surface of the first devolatilised viscous liquid 21 dispersed over the surface 223 of the second discharge region 222. In some embodiments the distributor sub-unit(s) 200 have shape(s) that are selected from plates, trays, or cones (also known as Chinese hats).

The second discharge openings 224 of the second discharge region 222 may be of different or same sizes and of different or same shapes. As discussed earlier for the case of the first discharge region 122, the opening density and/or the opening diameters of the second discharge openings 224 may be reduced and/or also the thickness of the second discharge region(s) 222 (e.g. a perforated plate) may be increased in order to provide an increased residence time of the first devolatilised viscous liquid 21 in the container 3 and/or increased specific surface of the first devolatilised viscous liquid 21 dispersed over the surface 223 of the second discharge region 222.

In some specific embodiments, the second discharge region 222 ranges in area from at least 10% larger than the area of the lower portion 120 (first devolatilised viscous liquid 21 discharge portion) of the first discharge region 122 up to the cross-sectional diameter of the container 3. Having a larger area of the second discharge region 222 beneficially minimizes problems with descending viscous liquid (e.g. polymer melt) bypassing the second discharge region 222.

In some other specific embodiments, a minimum distance between the first discharge region 122 and the second discharge region 222 is at least 1.5 times, preferably twice the diameter of the phase separation chamber 100. Maximizing this distances beneficially allows the descending viscous liquid (e.g. polymer melt) strands to degas and fall properly.

In still some other specific embodiments, the first discharge region 122 is oriented between 15 and 80 degrees, preferably between 20 and 70 degrees from a vertical axis. If the angle is too low, then the polymer strands do not separate well from each other, thus inhibiting devolatilization. If the angle is too high, then the hold-up and residence time of the viscous liquid (e.g. polymer melt) in the distributor is disadvantageously too low.

Figure 4:
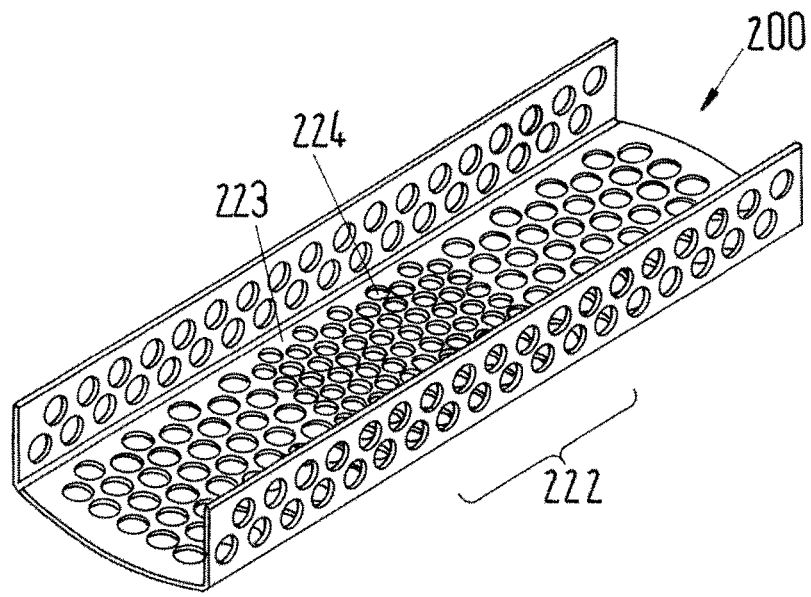
FIG. 4 shows a schematic view of a preferred embodiment of an distributor sub-unit according to the invention, in which the distributor sub-unit has a third discharge region having optional third discharge openings.
Figure 5:
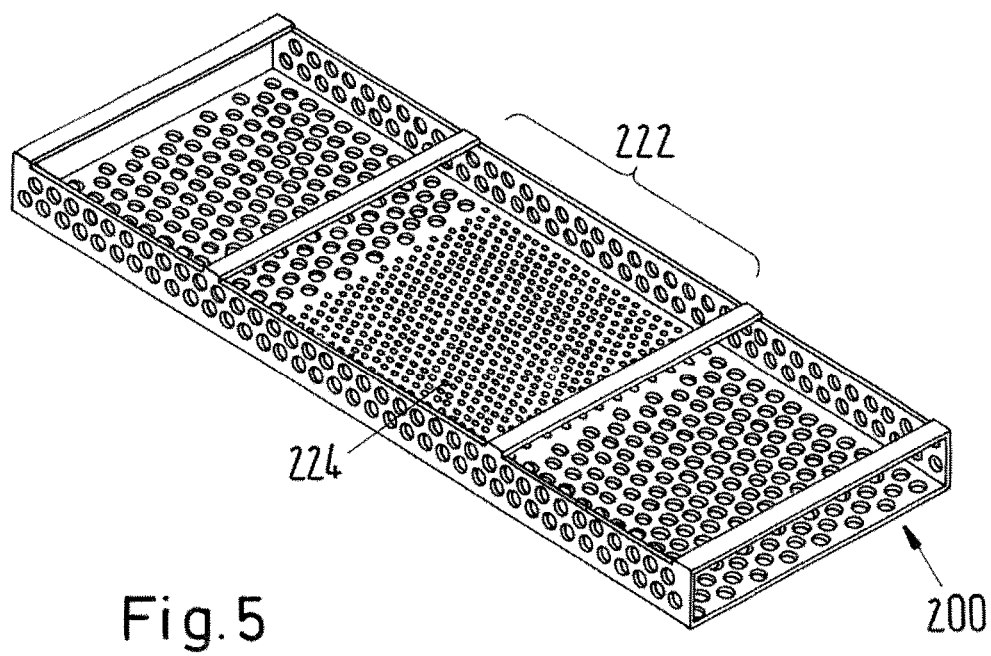
FIG. 5 shows a schematic view of an alternative preferred embodiment of a distributor sub-unit with a third discharge region having optional third discharge openings.
Figure 6:
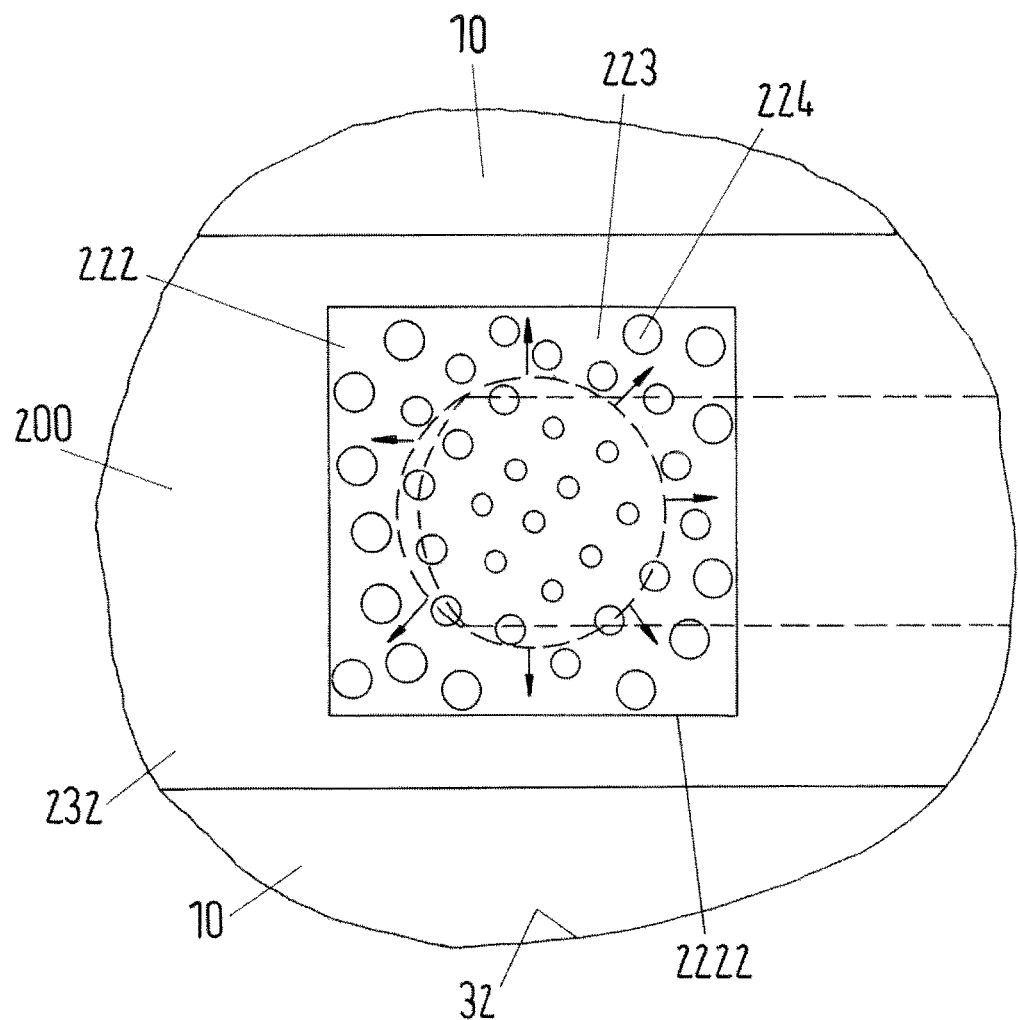
FIG. 6 shows a schematic view from above of a preferred embodiment of the apparatus in which the second discharge openings have cross-sectional areas that increase as the openings are progressively located towards an outer perimeter of the second discharge region.
Figure 7:
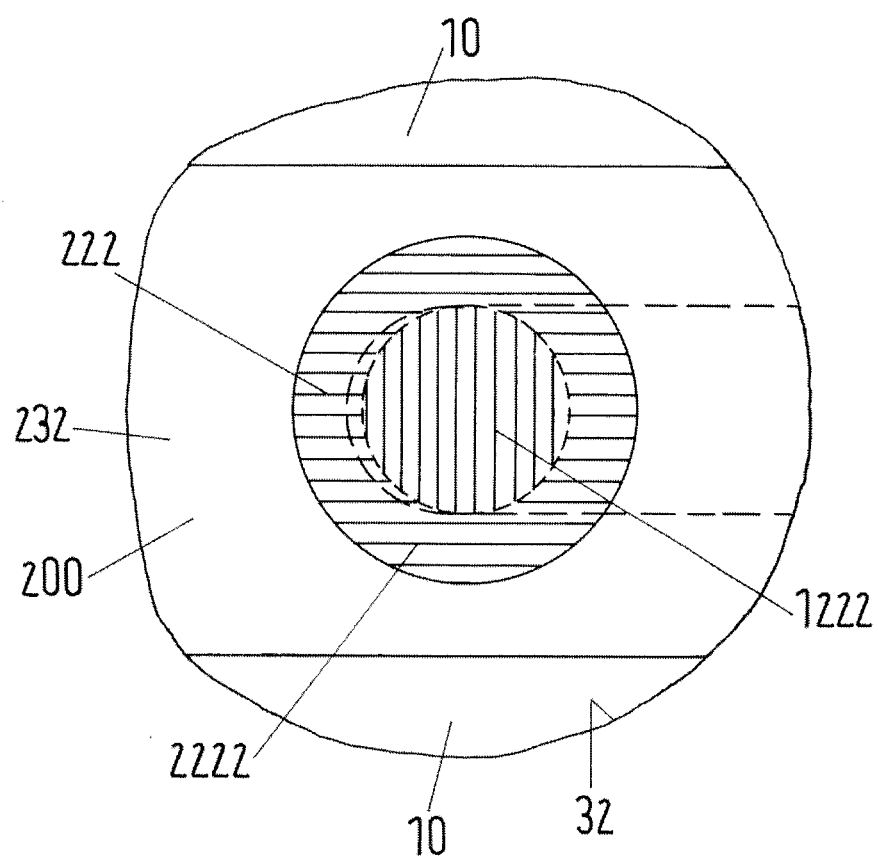
FIG. 7 shows a schematic view from above of a preferred embodiment of the apparatus in which the lower portion of the first discharge region has a first cross-sectional area that is less than a second cross-sectional area of the second discharge region.

Two preferred embodiments of distributor sub-units 200 are shown in FIGS. 4 and 5. It is noted that in some other preferred embodiments, the distributor sub-unit 200 has a third discharge region 232 embodied such that it is not contacted by the first devolatilised viscous liquid 21 discharged by the first discharge openings 124 of the phase separation chamber 100, and wherein the third discharge region 232 has third discharge openings 234 for discharge of a gas 6. Distributor sub-units 200 having such third discharge regions 232 with associated third discharge openings 234 are shown schematically in FIGS. 2 and 3. Typically embodiments having third discharge regions 232 with associated third discharge openings 234 will be ones in which the distributor sub-unit 200 covers the entire cross-section of the central region 7. Therefore the third discharge openings 234 allow for the passage of gas 6. Third discharge regions 234 without optional third discharge openings 234 are shown in FIGS. 6 and 7. In such embodiments of distributor sub-units 200 without optional third discharge openings 234, it will often be preferred to have a gap 10 present between the distributor sub-unit 200 and an inner wall 32 of the container 3 in order to facilitate the passage of gas 6 to the extraction line 9, as shown in FIGS. 6 and 7. As shown in FIG. 2, certain preferred embodiments may have both gaps 10 and third discharge openings 234 for a particularly efficient passage of gas. Gaps 10 and third discharge openings 234 may also beneficially minimize pressure increases over the length of the container 3. It is noted that for embodiments of the distributor sub-unit 200 in which the extraction line 9 is located below the distributor sub-unit 200, for example in the central region 7 or the lower sump region 4 (not shown), the gaps 10 or third discharge openings 234 allow the gas 6 to flow downwards past the distributor sub-unit 200 towards the extraction line 9. In any case, it will be advantageous to maintain sufficient volume and pathways within the container 3 to allow degassing vapors to travel freely as a gas 6 to the extraction line 9.

It is noted that in several specific embodiments, such as those shown in the Figures, that the distributor sub-units 200 are neither prism nor polyhedron in shape. Such shapes, as known from U.S. Pat. No. 5,118,388, are costly and complex to produce, and they typically function by blocking the viscous liquid 2 (e.g. a polymer melt) flow, which then overflows. Such blocking and overflow mechanisms disadvantageously increase the hold-up time of the polymer melt resulting in potential hot spots and thermal degradation of polymer melt. Furthermore, they often require the use of heating elements such as hot oil heating tubes, electrical heaters, or other suitable immersion heaters to prevent viscosity increases or even solidification in some areas. Additionally, such polyhedron-shaped deflectors often also require the use of deflectors to prevent splatter of foamed polymer melt to the sides of the devolatizer.

The first discharge openings 124 and gas discharge opening(s) 134 of the phase separation chamber 100, and the second discharge openings 224 and optional third discharge openings 234 of the distributor sub-unit 200 are not specifically limited as to size, shape or form, and in specific embodiments they may independently be selected from slits, holes, and perforations.

As illustrated schematically in FIG. 6, the second discharge openings 224 of the distributor sub-unit are embodied such that the openings 224 have cross-sectional areas that increase as the openings 224 are progressively located towards an outer perimeter 2222 of the second discharge region 222 in a preferred embodiment so as to minimize bypassing of the distributor sub-unit 200.

As illustrated schematically in FIG. 7, the lower portion 120 of the first discharge region 122 of the phase separation chamber 100 has a first cross-sectional area 1222 that is less than a second cross-sectional area of 2222 of the second discharge region 222 of the distributor sub-unit 200 in preferred embodiments of the apparatus 1 and process of the invention in order to minimize bypassing of the distributor sub-unit 200.

In a preferred embodiment of the apparatus 1 and process, the distributor sub-unit 200 is in the form of a perforated distributor plate installed in the central region 7 and below the phase separation chamber 100 and above the lower sump region 4. Such perforated distributor plates may conveniently be detachable, and they may conveniently be made in a variety of shapes including round, square and rectangular. In a preferred embodiment it will be round as this favors a homogenous distribution of the first devolatilised viscous liquid 21 over the surface 223 of its second discharge region 222. In a preferred embodiment, the perforated distributor plate has one or more lip regions partially or fully encompassing the outer edge of the plate, and preferably it will have two or four lips. Such lip regions may be used to assist in maintaining the distribution of the first devolatilised viscous liquid 21 over the surface 223 of second discharge region 222 and in preventing its bypass. The perforated distributor plate is installed within the container 3 so that the first devolatilised viscous liquid 21 discharged from the first discharge openings 124 of the phase separation chamber 100 falls in the center of the second discharge region 222 of the perforated distributor plate instead of being immediately evacuated by the discharge pump. The first devolatilised viscous liquid 21 will then be distributed over the surface 223 of the second discharge region 222 and treated in a second devolatilisation step on said surface 223. In order to help accomplish this, the second discharge openings 224 may be embodied such that the openings 224 have cross-sectional areas 2242 that increase as the openings 224 are progressively located towards an outer perimeter 2222 of the second discharge region 222, as may be seem schematically in the specific embodiment shown in FIG. 6. The dimensions of the perforated distributor plate will preferably be adapted to size of the man hole (not shown in Figures), and it may consist of two or more parts for ready transport, assembly and installation, if desired. For smaller apparatuses 1, the perforated distributor plate may simply lay on the top of the typically funnel-shaped lower sump region 4. However, for semi-industrial and industrial units, the perforated distributor plate will more typically be hung from the phase separation chamber 100 located above in the upper region 5 of the container 3. The phase separation chamber 100 will preferably be equipped with suitable fixation points and reinforced as necessary as the weight of the liquid hold-up in the plate may be significant.

The residence time of the first devolatilised viscous liquid 21 in the container 3 can be adjusted by varying the area of the surface 223 of the second discharge region 222 of the distributor sub-unit 200 or by varying the number and or diameter of the second discharge openings 224 located in the second discharge region 222. One skilled in the art will understand that the residence time may generally be increased by increasing the area of the surface 223 or by decreasing the number or diameter of the second discharge openings 224. The area of the surface 223, the thickness of the second discharge region 222, and the number and diameter of the second discharge openings 224 will be preferably matched to a provided throughput or throughput range of the devolatilisation apparatus 1 and/or the viscosity range of the first devolatilised viscous liquid 21.

As shown in FIGS. 2 and 3, the second devolatilised viscous liquid 22 is collected in the lower sump region 4 of the container 3. The second devolatilised viscous liquid 22 is removed from the container 3 by means of a discharge pump 8 in fluid communication with the lower sump region 4 for discharging the second devolatilised viscous liquid (22) therefrom. Not shown in the Figures, one skilled in the art will understand that a device will be used to regulate the level of the second devolatilised viscous liquid 22 in the lower sump region 4. The second devolatilised viscous liquid 22 may optionally still contain low levels of residues of volatile component(s), and these may optionally be removed—if desired—in a further devolatilisation apparatus (not shown).

As shown also in FIGS. 2 and 3, the volatile component(s) are removed from the container 3 as a gas 6 by means of the extraction line 9, which may be located in the upper region 5, the central region 7, or the lower sump region 4 of the container 3, optionally in fluid communication with a vacuum pump. The gas flows are shown with broken lines and arrows in the Figures; whereas the flows of the liquid phases (e.g. the viscous liquid 2, the first devolatilised viscous liquid 21, and the second devolatilised viscous liquid 22) are shown by means of solid lines and arrows. If the extraction line 9 is located in the central region 7 or especially the lower sump region 4, it will preferably be in fluid communication with a vacuum pump. In general, the extraction line 9 will be preferably located in the upper region 5 of the container 3.

Auxiliaries for the apparatus 1 are conventional and well-known in the art and include electrical supplies, coolant and heating fluid supplies and distributions, level controllers, pumps, valves, pipes and lines, reservoirs, drums, tanks, and sensors for measuring such parameters as flow, temperatures and levels. The apparatus 1 and the process of the invention may be conveniently controlled by means of a computer interface equipped with appropriate sensors.

Although not shown in the schematic figures for simplicity, one skilled in the art will understand that other conventional static devolatilisation apparatus and separation device internals may be used without limitation in the invention, such as feed devices like feed pipes and/or sumps, heat exchangers, support plates and grids, dispersers, disperser/support plates, continuous phase distributors, support and hold-down plates, baffles, deflectors, entrainment separators, and retainers/redistributors.

The container 3 is not specifically limited as to form, shape or composition. In the embodiments shown in FIGS. 2 and 3 it is cylindrical in shape. In order to minimize investment and maintenance costs, moving parts except for the discharge pump 8 are absent within the container 3 in several preferred embodiments of the apparatus 1.

Another aspect of the invention is a process for devolatilising a viscous liquid 2 comprising a volatile component using an apparatus 1 of the invention, wherein the process comprises:
 a first devolatilisation step in which the viscous liquid 2 is treated in a phase separation chamber 100 to form a first devolatilised viscous liquid 21, and
 a second devolatilisation step in which the first devolatilised viscous liquid 21 is treated in a distributor sub-unit 200 having a second discharge region 222 to form a second devolatilised viscous liquid 22, whereby the second discharge region 222 has a surface 223 embodied such that the second devolatilisation step takes place on said surface 223 and the residence time of the first devolatilised viscous liquid 21 in the container 3 and/or the specific surface of the first devolatilised viscous liquid 21 dispersed over the surface 223 of the second discharge region 222 is thereby increased.

An example specific embodiment of such a devolatilisation process of the invention is illustrated schematically in FIG. 2 for the case of that specifically-shown embodiment of the apparatus 1. The viscous liquid 2 to be treated in a first devolatilisation step to form a first devolatilised viscous liquid 21 enters the phase separation chamber 100 via inlet 110. In some embodiments, this viscous liquid 2 is a polymer composition comprising less than 25, preferably 20, more preferably 10 wt percent volatiles. As described earlier, this first devolatilisation step takes place in the phase separation chamber 100 by means of foam formation by expansion to produce a mixture of liberated gas 6 (volatile component(s)) and first devolatilised viscous liquid 21 (reduced-gas viscous liquid). A mean dwell time in the phase separation chamber 100 will preferably be provided of typically at least about 10 s, more preferably 30 s, for the development of the foam, with this mean dwell time being equal to the quotient from the liquid amount contained in the phase separation chamber 100 to the throughput. It is note that the provision of the distributor sub-unit 200 having a second discharge region 222, and its associated second devolatilisation step, advantageously allows quite short dwell times to be used in the phase separation chamber 100 in the present invention.

The resulting fractions (gas 6 and first devolatilised viscous liquid 21) are then discharged through the respective openings in a first discharge region 122 of the phase separation chamber 100. In particular, the gas 6 is discharged from the phase separation chamber 100 upwardly into the upper region 5 of the container 3 through at least one gas discharge opening 134 in the upper portion 130 (gas discharge portion) of the first discharge region 122. The larger the spacing is between the inlet 110 and the upper portion 130 of the first discharge region 122 and the longer the mean dwell time, the longer the period during which the amount of devolatilised gas 6 can increase. The volatile components are removed from the container 3 by the extraction line 9 as a flow of gas 6 (broken lines and arrows 6).

The position of the extraction line 9 in the apparatus 1 and process of the invention is not specifically limited. One skilled in the art will understand that other configurations of the apparatus 1 may have the extraction line in other locations (not shown), for example, in the central region 7 or the lower sump region 4 of the container. In the case of such other configurations, the initially upward flowing gas emitted by the gas discharge opening(s) 134 will be redirected in the corresponding process embodiments to follow other downward paths towards such other locations. In some embodiments of the apparatus 1 and process of the invention, the apparatus 1 may have more than one extraction line 9. In such cases, liberated gases 6 will typically flow to the nearest extraction line 9 or the one most favorably located due the pressure differences and/or flow patterns of purge gases and/or stripping agents.

The first devolatilised viscous liquid 21 having a reduced content of volatile component(s) is discharged from the phase separation chamber 100 by means of a plurality of first discharge openings 124 located in the lower portion 120 of the first discharge region 122, and the first devolatilised viscous liquid 21 is discharged from the phase separation chamber 100 downwardly towards the lower sump region 4 of the container 3.

In contrast to apparatuses 1' of the prior art (e.g. FIG. 1), first devolatilised viscous liquid 21 does not flow then straight into the discharge pump 8' and it is not directly evacuated. Instead in the process and apparatus 1 of the invention, the first devolatilised viscous liquid 21 contacts the second discharge region 222 of the distributor sub-unit 200 located in the central region 7 of the container 3 and below the phase separation chamber 100 and above the lower sump region 4.

As shown schematically in FIGS. 6 and 7, it will generally be preferred to have the lower portion 120 of the first discharge region 122 of the phase separation chamber 100 centered over the second discharge region 222 of the distributor sub-unit 200 located below it so as to minimize/ eliminate any bypass of the distributor sub-unit 200 by the falling first devolatilised viscous liquid 21. It is noted that the outer contour of the phase separation chamber 100 is illustrated schematically by means of a broken line in FIGS. 6 and 7.

The second discharge region 222 has a surface 223 on which a second devolatilisation step takes place. The first devolatilised viscous liquid 21 impinging the second discharge region 222 is not able to readily pass directly through the plurality of second discharge openings 224 because of their relatively small size and/or density and/or their relatively long path length through the thickness of the second discharge region 222. As a result, the first devolatilised viscous liquid 21 becomes dispersed over the surface 223 of the second discharge region 222, and the dotted line and arrows in FIG. 6 illustrate schematically the outward flow of the first devolatilised viscous liquid 21 over the surface 223. As a result, the first devolatilised viscous liquid 21. thereby increases its residence time in the container 3 and/or its specific surface. Increasing the residence time and/or specific surface acts to promote the devolatilisation of volatile component(s) as a gas 6 from the first devolatilised viscous liquid 21, thereby forming a second devolatilised viscous liquid 22.

One skilled in the art will understand that varying the area of the surface 223, the size and the density of the second discharge openings 224 and their path length through the thickness of the second discharge region 222 will allow one to then vary and control the dwell time in the second devolatilisation step. For example, decreasing the area of the surface 223, increasing the size or the density of the second discharge openings 224, or decreasing the path length through the thickness of the second discharge region 222 will all act to decrease the residence time of the first devolatilised viscous liquid 21 on the surface 223. In embodiments of the distributor sub-unit 200 having second discharge openings 224 that increase in their cross-sectional areas as the openings 224 are progressively located towards an outer perimeter 2222 (as shown schematically in FIG. 6), the dwell time may be increased by making the centrally-located openings smaller or lower in density and/or limiting the progression in increasing cross-sectional area.

It is noted that by providing the second discharge region 222 with a fairly open structure due to the presence of the plurality of second discharge openings 224 favourably does not expose the first devolatilised viscous liquid 21 to pressure increases in the second devolatilisation step even in the case of strong foaming on the surface 223.

As shown schematically in FIGS. 6 and 7, the dispersion of the first devolatilised viscous liquid 21 over the surface 223 of the second discharge region 222 may be favorably promoted and also bypass of the distributor sub-unit minimized in embodiments in which the lower portion 120 of the first discharge region 122 has a first cross-sectional area 1222 that is less than a second cross-sectional area of 2222 of the second discharge region 222. In specific embodiments, the ratio of the second cross-sectional area of 2222 to the first cross-sectional area 1222 is preferably at least 2:1, more preferably 3:1, and most preferably 4:1. It will be desirable to use larger ratios for more highly viscous liquids in order to ensure that they are dispersed over a large surface area prior to discharge. Such arrangements of relative cross-sectional areas not only prevents falling first devolatilised viscous liquid 21 from not contacting the second discharge region 222, but also help ensure that the first devolatilised viscous liquid 21 is dispersed over a surface 223 having a relatively large area so as to achieve a relatively high specific surface of the first devolatilised viscous liquid 21 in the second devolatilisation step.

The second devolatilised viscous liquid 22 thus has a reduced content of volatile component(s) relative to the first devolatilised viscous liquid 21, and the second devolatilised viscous liquid 22 passes through the plurality of second discharge openings 224 and is discharged downwardly into the lower sump region 4 of the container 3, as shown in FIG. 2. The discharge pump 8 then discharges the second devolatilised viscous liquid 22 from the lower sump region 4 of the container 3.

The gas 6 containing the volatile component(s) released in the second devolatilisation step is discharged from the distributor sub-unit 200 towards the extraction line 9. In the specific embodiment shown in FIG. 2, the gas 6 is discharged in an upward direction towards the extraction line located in the upper region 5 of the container 3 (shown schematically as the broken lines and arrows in FIG. 2).

In the process of the invention, the pressure in the container 3 is not specifically limited and it may be under a reduced pressure (e.g. by means of a vacuum pump) or over-pressure (e.g. by means of purge gas flows) or at atmospheric pressure. In general, the pressure will be homogeneous in the container 3 without significant pressure differences or drops between the upper 5, central 6 and lower sump 4 regions. One skilled in the art will understand that the preferred choice of pressure will depend on the properties and content of the volatile component(s) present in the viscous liquid 2, as well as the amount and extent of volatile component(s) to be removed in the static devolatilisation process. In many preferred embodiments of the process, a relatively low operating temperature is achieved by means of a suitably low pressure (less than atmospheric) within the container 3, in some preferred embodiments the pressure is less than 100, preferably 50, more preferably 30, most preferably 10 mbar absolute. The optimum temperature and pressure will depend on the viscous liquid 2 (e.g. polymer) and the volatile component(s) and their specific properties such as degradation temperatures and vapor pressures, as well as the specifications and desired properties of the product. For example, devolatising a solvent from a rubber too quickly maybe makes it too viscous to be readily discharged, and therefore such devolatilisation processes will often be done above atmospheric pressure. The temperature is also not specifically limited, but higher temperatures will tend to promote flow and dispersion on the surface 223, as well as increasing the vapor pressure of volatile component(s). The temperature should not be too high though as this may promote thermal degradation or crosslinking. In some example embodiments involving polymer melts or solutions, operating temperature will be preferably above 50, 100, 150, 200, 250 C, depending on the specific polymer and its melt viscosity.

Further gases 6 formed from the volatile component(s) can additionally be liberated in part from falling strands in the container 3. As shown schematically in FIG. 2, such gases 6 may be liberated from falling strands of first devolatilised viscous liquid 21 discharged from the lower portion 120 of the first discharge region 122 of the phase separation chamber 100 or of second devolatilised viscous liquid 22 discharged from the plurality of second discharge openings 224 of the second discharge region 222 of the distributor sub-unit 200.

As shown in FIG. 2, in some specific embodiments of the apparatus 1, a gap 10 is present, and, in corresponding specific embodiments of the process, such gaps 10 beneficially allow for an easy escape of released gas 6, for example, volatile component(s) released from falling strands or from the second devolatilised viscous liquid 22 collected in the lower sump region 4. This is illustrated schematically by the broken lines and arrows in FIG. 2. Also as shown schematically in FIG. 2, in certain specific embodiments of the process, released gas 6 may pass upwards thru the distributor sub-unit 200 by means of optional third discharge openings 234. Such third discharge openings 234 are also schematically illustrated in the embodiment of FIG. 3, and gaps 10 are additionally illustrated schematically in the embodiments of FIGS. 6 and 7. Such specific process embodiments having the upward flow of gas 6 thru gaps 10 and/or third discharge openings 234 will be particularly beneficial when apparatuses 1 are used in which the extraction line 9 is located above the distributor sub-unit 200, as illustrated schematically in FIGS. 2 and 3.

In other embodiments of the process of the invention, as shown, for example, schematically in FIG. 3, the second devolatilised viscous liquid 22 contacts the second discharge region(s) 222 of further distributor sub-units 200 prior to reaching the lower sump region 4 and being discharged by the discharge pump 8. Such further distributor sub-units 10 will therefore act to increase the residence time of dispersed liquid phase in the container 3 and to increase its specific surface. The second discharge openings 224 of the second discharge region 222 may be of different or same sizes and of different or same shapes for the further distributor sub-units 200. The top distributor sub-unit 200 may have second discharge openings 224 that preferably increase in cross-sectional area as they are progressively located towards the outer perimeter 2222, but such increasing cross-sectional areas would not generally be used for the lower further distributor sub-units 200 as the first devolatilised viscous liquid 21 (e.g. polymer) has already spread out and been distributed by the first top distributor sub-unit 200. In the specific embodiment shown in FIG. 3, there are two such further distributor sub-units. Further devolatilisation steps take place then in each of these further distributor sub-units 200 then in which the liquid phase is dispersed over the surfaces 223 of each of their second discharge regions 222, thereby increasing the residence time of the liquid phase in the container 3 and increasing its specific surface. Such apparatus 1 and process embodiments having further distributor sub-units 200 will also particularly benefit from the presence of gaps 10 and third discharge openings 234 to facilitate flow of gas 6 liberated from or between interior distributor sub-units 200, for example, in embodiments in which the extraction line 9 is located above the topmost distributor sub-unit 200, as shown schematically in the embodiment of FIG. 3.

Static devolatilisation processes are well known in the art, for example, as disclosed in the earlier cited text- and reference books. Unless indicated otherwise, the various viscous liquid feed streams and operating parameters and conditions of such conventional types of devolatilisation processes may be used here in the static devolatilisation processes according to the invention and making use of the apparatus 1.

This static devolatilisation process of the invention has the benefit of making possible a reduction in the operating temperature of the process due to the increase in residence time and specific surface of the second devolatilised viscous liquid 22 resulting from the use of the distributor sub-unit 200. This is both more economical and makes the process milder, thereby minimizing problems of thermal degradation and decomposition of thermally-sensitive polymers. Therefore the operating temperature of the process of the invention is not specifically limited. One skilled in the art will understand that the temperature of the viscous liquid 2 entering the phase separation chamber 200, as well as the phase separation chamber 200 and its first discharge region 122 will be high enough for the viscous liquid 2 and the first devolatilised viscous liquid 21 to flow and for volatile component(s) to be devolatilised. Analogously, one skilled in the art will understand that the container 3 and particularly the distributor sub-unit 200 and its second discharge region 222 having surface 223 will be maintained at operating temperatures high enough for the flow of the first devolatilised viscous liquid 21, particularly for it to be dispersed over said surface 223, and for the second devolatilized viscous liquid 22 to be discharged via the plurality of second discharge openings 224 to the lower sump region 4 and subsequently discharged from the container 3 by the discharge pump 8.

One skilled in the art will understand that—as in the case of prior art static devolatilisation apparatuses—there are also significant interactions between the operating temperature, residence time and operating pressure of the apparatus 1 of the invention, as well as its phase separation chamber 100 and distributor sub-unit 200. The optimum process conditions may readily be determined for a particular viscous liquid 2 comprising a volatile component however in a limited number of trials, potentially with the assistance of computational process modeling software.

The devolatilisation process in accordance with the invention can also be carried out using a stripping agent (e.g. water, carbon dioxide, nitrogen). The stripping agent may, for example, be mixed into the viscous liquid 2 to be treated before entry into the phase separation chamber 100, with a static mixer preferably being used for this purpose. The stripping agent is advantageously mixed with the viscous liquid 2 to be treated at an elevated pressure, i.e. before an expansion device. If the mixing is not sufficient, damage due to abruptly expanding bubbles can arise on expansion. Alternatively or additionally, the stripping agent may be dosed directly into the container 3 by means of an inlet 300, preferably an inlet 300 located in the lower sump region 4.

Yet another aspect of the present invention is the use of the static devolatilisation apparatus 1 of the invention in the devolatilisation of a viscous liquid 2, preferably a polymer melt or polymer solution, comprising a volatile component. Specific polymers and their volatile component(s) that may benefit from the use of the apparatus 1 and process of the invention have been mentioned earlier, and such devolatilisation processes may be used, for example, for solvent, monomer and/or condensation byproduct recovery in polymerization plants. As discussed earlier, the apparatus 1 and process of the invention bring significant benefits when devolatilising such volatile components from highly viscous polymer solutions and polymer melts.

EXAMPLES

The following examples are set forth to provide those of ordinary skill in the art with a detailed description of how the static devolatilisation apparatus 1 therein, processes, and uses claimed herein are evaluated, and they are not intended to limit the scope of what the inventors regard as their invention.

In these examples, the static devolatilisation apparatus 1 and process of the invention were successfully used in a typical application for the devolatilisation of a polyester containing unreacted monomer as a volatile species to be removed.

In a comparative example, the process was carried out using a static devolatilisation apparatus 1 having a phase separation chamber 100 but without a distributor sub-unit 200. Several samples of the devolatilised polyester polymer produced had an average residual monomer content of 6,000 ppm.

In a working example of the invention, a distributor sub-unit 200 was installed in the central region 7 below the phase separation chamber 100 and above the lower sump region 4. Several samples of the devolatilised polyester polymer produced were taken again and the average residual monomer content was found to be reduced to 2,500 ppm.

In both the comparative example and the working example all process conditions were the same. Therefore the examples demonstrate that the use of the distributor sub-unit 200 as in the claimed invention allows a much lower concentration of residual volatile components (e.g. residual monomer) to be obtained for the same process conditions. As a result of the reduced concentration of residual monomer, the processability and the stability of the polymer could be improved.

While various embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

The invention claimed is:

1. A static devolatilisation apparatus for devolatilising a viscous liquid comprising a volatile component, wherein the apparatus comprises:
   a container for receiving a first devolatilised viscous liquid, said container having a lower sump region for collecting a second devolatilised viscous liquid, an upper region for discharging a gas, and a central region between said lower sump region and said upper region;
   a discharge pump in fluid communication with said lower sump region for discharging the second devolatilised viscous liquid therefrom;
   an extraction line for discharging gas from the container; and
   a phase separation chamber in said upper region of said container, wherein the phase separation chamber comprises an inlet for the viscous liquid to be treated in a first devolatilisation step to form a first devolatilised viscous liquid, a plurality of first discharge openings in a lower portion of a first discharge region for discharging said first devolatilised viscous liquid downwardly towards said lower sump region and at least one gas discharge opening in an upper portion of said first discharge region for discharging gas upwardly to said extraction line,
   wherein a valve is in fluid communication with the inlet of the phase separation chamber,
   wherein a distributor sub-unit is located in said central region and below the phase separation chamber and above the lower sump region, wherein the distributor sub-unit has a second discharge region, wherein a minimum distance between the first discharge region and the second discharge region is at least 1.5 times the diameter of the phase separation chamber, and
   wherein the second discharge region is embodied such that it is contacted by the first devolatilised viscous liquid discharged from the first discharge openings of the phase separation chamber, and wherein the second discharge region has a surface embodied such that the first devolatilised viscous liquid is treated in a second devolatilisation step on said surface to form a second devolatilised viscous liquid, and wherein the second discharge region additionally has a plurality of second discharge openings in fluid communication with the discharge pump and for the discharge of said second devolatilised viscous liquid.

2. The apparatus of claim 1, wherein the distributor sub-unit has a third discharge region embodied such that it is not contacted by the first devolatilised viscous liquid discharged by the first discharge openings of the phase separation chamber.

3. The apparatus of claim 2, wherein the lower portion of the first discharge region has a first cross-sectional area that is less than a second cross-sectional area of the second discharge region.

4. The apparatus of claim 2, wherein the discharge region has third discharge openings for discharge of a gas.

5. The apparatus of claim 1, wherein there is a gap present between the distributor sub-unit and an inner wall of the container.

6. The apparatus of claim 1, wherein the second discharge openings are embodied such that the openings have cross-sectional areas that increase as the openings are progressively located towards an outer perimeter of the second discharge region.

7. The apparatus of claim 1, wherein the apparatus additionally comprises one to four further distributor sub-units.

8. The apparatus of claim 7, wherein the surface(s) of the second discharge region(s) of the distributor sub-unit(s) are embodied such that the surfaces(s) of the second discharge region(s) increase a residence time of the first devolatilised viscous liquid in the container and/or a specific surface area of the first devolatilised viscous liquid dispersed over the surface(s) of the second discharge region(s).

9. The apparatus of claim 7, wherein the distributor sub-unit(s) have shape(s) that are selected from plates, trays, or cones.

10. The apparatus of claim 1, wherein moving parts are absent within the container.

11. The apparatus of claim 1, wherein the inlet of the phase separation chamber is located in the lower sump region.

12. The apparatus of claim 11, wherein the apparatus has an inlet for the dosing of a stripping agent.

13. A process for devolatilising a viscous liquid comprising a volatile component using the apparatus of claim 1, wherein the process comprises:
   a first devolatilisation step in which the viscous liquid is treated in a phase separation chamber to form a first devolatilised viscous liquid, and
   a second devolatilisation step in which the first devolatilised viscous liquid is treated in a distributor sub-unit having a second discharge region to form a second devolatilised viscous liquid, whereby the second discharge region has a surface embodied such that the second devolatilisation step takes place on said surface and a residence time of the first devolatilised viscous liquid in the container and/or a specific surface of the first devolatilised viscous liquid dispersed over the surface is thereby increased.

14. The process of claim 13, wherein the viscous liquid is a polymer melt or polymer solution and the volatile component is a solvent or a monomer.

15. The process of claim 13, wherein a stripping agent is dosed to the viscous liquid before the first devolatilisation step and/or dosed in the container by means of an inlet.

16. The process of claim 15, wherein the inlet is located in the lower sump region.

17. A method for devolatilising a viscous liquid comprising steps of providing the apparatus of claim 15 and using the apparatus of claim 15 in the devolatilisation of viscous liquid, thereby devolatilising the viscous liquid.

18. The method of claim 17, wherein the viscous liquid is a polymer melt or polymer solution, comprising a volatile component.

* * * * *

UNITED STATES PATENT AND TRADEMARK OFFICE
CERTIFICATE OF CORRECTION

PATENT NO. : 10,143,941 B2
APPLICATION NO. : 14/763707
DATED : December 4, 2018
INVENTOR(S) : Francois Loviat It is certified that error appears in the above-identified patent and that said Letters Patent is hereby corrected as shown below:

In the Claims

Column 22, Claim 8, Line(s) 37 should read:
...embodied such that the surface(s) of the second discharge...

Column 22, Claim 12, Line(s) 50 should read:
The apparatus of claim 1, wherein the apparatus has...

Signed and Sealed this
Fifth Day of July, 2022

Katherine Kelly Vidal
*Director of the United States Patent and Trademark Office*